United States Patent [19]
Van Steenbrugge

[11] Patent Number: 6,076,062
[45] Date of Patent: *Jun. 13, 2000

[54] METHOD AND DEVICE FOR TRANSFERRING AND DECODING A NON-PCM BITSTREAM BETWEEN A DIGITAL VIDEO DISC AND A MULTI-CHANNEL REPRODUCTION APPARATUS

[75] Inventor: Bernard Van Steenbrugge, Eindhoven, Netherlands

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/798,198

[22] Filed: Dec. 9, 1996

[30] Foreign Application Priority Data

Dec. 7, 1995 [EP] European Pat. Off. .............. 95203376

[51] Int. Cl.[7] .................................................. H04L 27/00
[52] U.S. Cl. ......................... 704/500; 348/515; 348/484; 382/232; 375/364
[58] Field of Search ............................... 704/500; 375/7, 375/364; 382/232; 348/515, 484

[56] References Cited

U.S. PATENT DOCUMENTS

| | | | |
|---|---|---|---|
| 4,429,384 | 1/1984 | Kaplinsky | 370/85 |
| 5,323,396 | 6/1994 | Lokhoff | 370/94.1 |
| 5,359,626 | 10/1994 | Kloker et al. | 375/7 |
| 5,530,655 | 6/1996 | Lokhoff et al. | 364/514 |
| 5,539,829 | 7/1996 | Lokhoff et al. | 381/2 |
| 5,544,247 | 8/1996 | Ten Kate | 381/27 |
| 5,606,618 | 2/1997 | Lokhoff et al. | 381/2 |
| 5,675,693 | 10/1997 | Kagoshima | 386/68 |
| 5,687,191 | 11/1997 | Lee et al. | 375/216 |

FOREIGN PATENT DOCUMENTS

| | | |
|---|---|---|
| 0402973A1 | 12/1990 | European Pat. Off. . |
| WO9512254 | 5/1995 | WIPO . |

*Primary Examiner*—David R. Hudspeth
*Assistant Examiner*—Vijay B. Chawan
*Attorney, Agent, or Firm*—Leroy Eason

[57] ABSTRACT

An audio bitstream is read from a digital video disc DVD for transfer, subsequent to parsing thereof, via an IEC 958 protocolled interface, for use in a multi-channel audio reproduction apparatus. For each respective audio channel MPEG audio samples are packaged recurrently in burst payloads, and these burst payloads are packaged as user data in IEC958 format frames. Pause bursts are used for signalling absence of audio for all associated channels with, each pause burst representing such audio absence during a perceptibly acceptable time interval only.

9 Claims, 7 Drawing Sheets

| MPEG-1 header | MPEG-1 Audio | MC extension part-1 | anc. data | |

MPEG-2 layer 2 Base frame

FIG. 4A PRIOR ART

| | Ext. header | MC extension part-2 |

FIG. 4B PRIOR ART   MPEG-2 layer 2 Ext. frame

| MPEG-1 header | MPEG-1 Audio | MC extension part-1 | anc. data | Ext. header | MC extension part-2 | b0

MPEG-2 layer 2 Synchronised and concatenated Base and extension frames:

FIG. 4C PRIOR ART

| Pa | Pb | Pc | Pd | MPEG-2 Payload | stuffing '0's | b0

MPEG-2 base frame, with extension frame repetition time of burst

FIG. 4D
PRIOR ART

| Pa | Pb | Pc | Pd | stuffing bits all '0's | b0    repetition time of a burst of data_type PAUSE

METHOD AND DEVICE FOR TRANSFERRING AND DECODING A NON-PCM BITSTREAM BETWEEN A DIGITAL VIDEO DISC AND A MULTI-CHANNEL REPRODUCTION APPARATUS

BACKGROUND OF THE INVENTION

The invention relates to a method of transferring a non-PCM encoded audio bitstream read from a digital medium, subsequent to parsing thereof, via an IEC 958 protocolled interface to a multi-channel audio reproduction apparatus.

Digital video disc standardizing is proceeding at an accelerated pace. Commercially available MPEG1 decoder circuit SAA2502 is able to decode compressed digital audio received as a continuous bit stream. Present-day MPEG2 technology has standardized 5 channels, to wit: Left, Right, Center, Left Surround, Right Surround, and furthermore a low frequency enhancement (LFE) channel. The MPEG2 bit stream is distributed into frames of 1152 samples for each of the actual channels, and player operation is controllable in a non-uniform manner on a frame-to-frame basis. For example, the number of actual channels may vary, and certain ones or all of them may be outputting silence.

General background to the invention is given by the following earlier documents, all being at least co-assigned to the present assignee and being herein incorporated by reference:

EP Patent 402 973, EP Patent Application 660 540, corresponding U.S. Pat. No. 5,323,396, issued Jun. 21, 1994, which is a continuation of U.S. application Ser. No. 07/532, 462, abandoned; U.S. Pat. No. 5,606,618, issued Feb. 25, 1997; U.S. Pat. No. 5,530,655, issued Jun. 25, 1996; U.S. Pat. No. 5,539,829, issued Jul. 23, 1996; U.S. Pat. No. 5,777,992, issued Jul. 7, 1998; and pending U.S. application Ser. No. 08/488,536, describing a Musicam Layer 1 encoder and decoder for L and R signals;

EP 678 226, corresponding to U.S. Pat. No. 5,544,247, issued Aug. 6, 1996, describing encoding and decoding of L, R and C channels;

U.S. patent application Ser. Nos. 08/032,915, 08/180,004, 08/427,046, describing the matrixing of bitrate-reduced L, R, C, SL and SR signals.

Now, in a consumer application (SPDIF) of the above specified digital video disc, two subframes are specified that each can simultaneously carry 32 bit data words. This allows to transfer via the IEC 958 bitstream either 2-channel linear PCM audio, or a set of alternating bitstreams, but not those configurations simultaneously. The IEC 958 standard specifies a widely used method for interconnecting digital audio equipment with 2-channel linear PCM audio. A need has been encountered to allow transferring non-PcM encoded audio bitstreams for consumer applications in the same protocolled environment, and in particular pause bursts, in case one or more of the audio channels would represent silence. In particular, the granularity of such pause representation at the receiver side should be sufficiently brief from a perceptive standpoint.

SUMMARY OF THE INVENTION

Accordingly, amongst other things, it is an object of the present invention to extend present protocols to allow transfer of non-PCM encoded audio bitstreams for consumer applications in the same protocolled environment.

This and other objects, features and advantages according to the present invention are provided by a method for decoding a non-PCM encoded audio bit stream, which can be read from a digital medium. Preferably, the method includes the steps, executed for each respective audio channel, of recurrently packaging MPEG audio samples in burst payloads, and packaging the burst payloads as user data in IEC958 format frames, including pause bursts which signal the absence of audio for all associated channels. According to one aspect of the present invention, each pause burst represents such audio absence during a perceptively acceptable time interval only.

According to the state of the art, the above granularity could reach several tens of milliseconds, which the present inventor has found unacceptably long. According to the invention, the granularity is in the millisecond range which is acceptable in all circumstances encountered at present.

These and other objects, features and advantages according to the present invention are proved by a method for receiving a non-PCM encoded audio bitstream emanating from a parsed bitstream read from a digital versatile disc DVD via an IEC 958 protocolled interface for use in a multi-channel reproduction apparatus. Advantageously, the method includes steps for receiving the parsed bitstream as a sequence of frames each accommodating, for each applicable bitstream, a uniform number of data bits, storing each frame in an intermediate frame buffer; detecting presence or absence of data pertaining to a particular output channel. Moreover, in response to the detecting step, executing decoding and outputting decoded information for the particular channel. However, under control of one or more pause bursts received, as representing a sequential multiplicity of absence of the detecting, controlling a soft mute block. It will be appreciated that this feature provides for straightforward decoding of the pause bursts for subsequent representation by a soft mute block.

These and other objects, features and advantages according to the present invention are provided by a device for implementing the method described immediately above, either on the encoding or the decoding side. Further advantageous aspects of the invention are set forth hereinafter.

BRIEF DESCRIPTION OF THE DRAWINGS

These and further aspects and advantages of the invention will be discussed more in detail hereinafter with reference to the disclosure of preferred embodiments, and more in particular with reference to the following drawings, in which:

FIGS. 1–3, 4A, 4B, 4C, 4D and 5, show various information formats;

DESCRIPTION OF THE PREFERRED EMBODIMENTS

1. Data Formats

Figure 1:
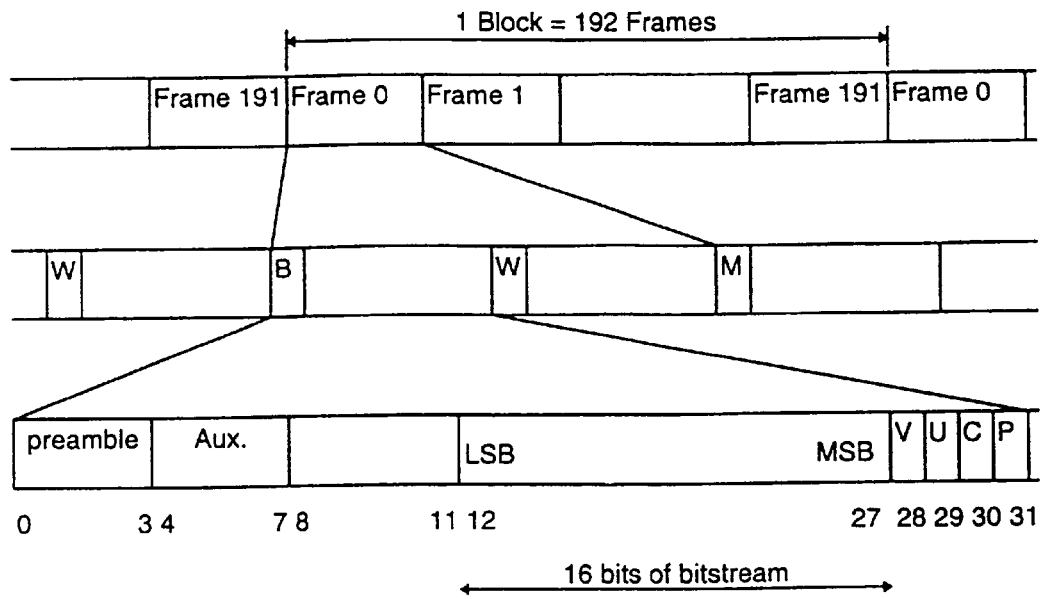

For better detailing the invention, first various applicable information formats are described. FIG. 1 shows the IEC958 format, which according to the upper diagram consists of a concatenation of frames grouped into blocks of 192 frames each. The second diagram shows each frame to consist of two sub-frames. The first frame of a block has subframes labelled B (left) and W (right), further subframes are all labelled M. The third diagram shows the setup of a subframe. As shown, it has four preamble bits, four auxiliary bits, four unused bits, sixteen data bits or bitstream, and four flag bits V, U, C, P. The flag bits indicate the following:

V indicates no deviation from the standard;

U indicates user data with '0' default;

C contains one bit of a channel status word; and

P is a parity bit relating to bits 4 through 31.

A pair of subframes may contain one PCM word from each of left and right channels.

According to the present invention, for consumer applications, the channel status word as built from a sequence of C bits has the following meaning: bit b0 with value 0 indicates consumer PCM audio, bit bi with value 1 indicates Non-linear PCM samples, bits 8 through 15 contain a category code. Furthermore, the MPEG header indicates audio sample rate and sample size in bits.

Now, audio bit streams as read from the DVD disc may contain gaps, that may be due to pauses in the audio, or to a trick mode of the related video source, such as the transition to a freeze picture produced in track mode. Now, during transfer in bursts on the IEC 958, these gaps in the bit stream may remain unused or rather, filled with bursts of the data_type 'pause' to be described hereinafter. If the gap occurs in MPEG1 layer 1, or in MPEG 1 layer 2 or 3 data, or in MPEG2 without extension, or in MPEG2 data with extension audio bitstream, the gap will be filled with a sequence of bursts of data_type 'pause'. These bursts may have the minimum allowable length therefor, corresponding to 32 sample periods. Preferably, this number is three times as long, so corresponding to 96 sample periods, which is the recurrency of LFE samples.

It is possible on this interface to simultaneously convey multiple multi-channel non_PCM encoded data streams, for example relating to both a main audio service and to an associated audio service. In that case, the burst of the associated service occurs before the burst of the main service to which it is associated.

Figure 2:
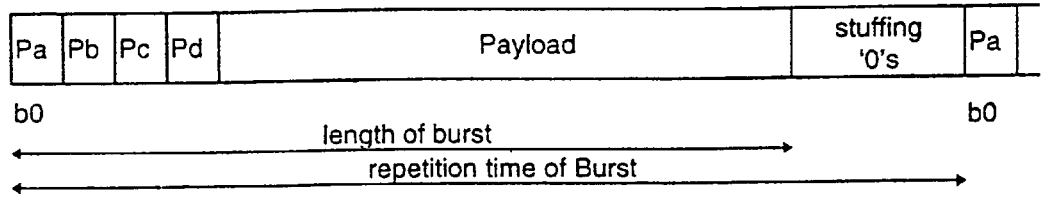

FIG. 2 describes the burst format attained by unpacking the user information of an IEC 958 block in a standard manner, or rather before the packing of an IEC 958 block. The burst has a fixed repetition time related to the number of audio samples for each channel encoded within that frame. Any unused bit between two bursts is set to zero. Each burst has four sixteen-bit preamble words, with the following meanings: Pa, Pb sync words, Pc burst info to be specified hereinafter, Pd length of payload in bits. Subsequently, the burst contains a payload field and is optionally terminated by stuffing zeroes to attain its pre-specified format. An advantageous, but not mandatory lower bound for the number of stuffing zeroes is 32. The payload also contains the MPEG header. The format of non-PCM encoded Audio bitstreams allows multiplexed conveying of more than one bitstream, wherein a burst can fill the space of stuffed zeroes from other bursts. The sampling frequency must be uniform across the bursts. The field Pc has the following codes:

| Pc Bits | value | content | repetition of burst in number of sample periods |
|---|---|---|---|
| 0–4 | 0 | Null data | @4096 |
| | 1 | AC-3 stream | 1536 |
| | 2 | SMPTE time stamp | |
| | 3 | MPEG1 layer 1 data | 384 |
| | 4 | MPEG1 layer ⅔ or MPEG 2 without extension | 1152 |
| | 5 | MPEG2 with extension | 1152 |
| | 6 | PAUSE | 32 or 96 |
| | 7 | ACX data | 1024 |
| | 8 | MPEG 2 layer 1 low sample rate | 384 |
| | 9 | MPEG2 layer ⅔ low rate | 1152 |
| | 10–31 | Reserved | |

The content of further bits of Pc is irrelevant to the present invention. The provision of the relatively brief 'pause' burst allows a low granularity size of 'soft mute' intervals controlled thereby. The indication of the various burst type specifications by Pc bit values 3, 4, 5, 8, 9, allows an extremely flexible control policy.

Figure 3:
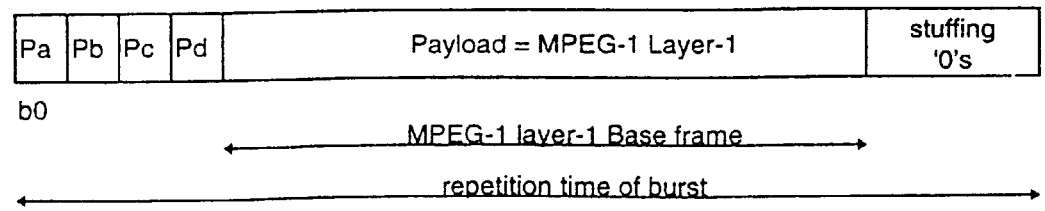

FIG. 3 shows an MPEG1 layer 1 base frame that has a length of 384 sample periods (each of L and R). The various aspects of the format have been considered supra. The base frame for the payload of the MPEG1 layer ⅔ or MPEG2 without extension has the same shape, be it with a length of 1152 instead of 384 sample periods. MPEG2 allows transfer of five audio channels in parallel. In certain circumstances, the MPEG2 burst needs an extension that has been shown in FIGS. 4B and 4C.

Now, an MPEG2 frame comprises 1152 samples for each encoded channel. The burst as shown in the uppermost row, is headed by a burst_preamble, followed by the payload, and stuffed with stuffing zero bits. The payload numbers up to 36768=1152×32 bits. Furthermore, there are at least 32 stuffing zeroes and 64 bits for the Pa..Pd header. Bitstreams matching the MPEG layer 2 data type are:

either encoded according to MPEG2 layer 2 or 3, or even encoded according to MPEG2 layer 1 'superframe'.

A burst with an Audio frame consists of a synchronized and concatenated Base frame (MPEG1 compatible) and an extension frame. FIG. 4A shows the MPEG2 layer 2 base frame, with MPEG1 header, MPEGi Audio field, MC (multichannel) extension part i field, and a field for ancillary data. If extension is necessary, additional format according to FIG. 4B is appended that contains in MPEG2 layer 2 Extension frame an Extension header followed by the MC extension part 2. FIG. 4C of this shows the formats of FIGS. 4A and 4B both synchronized and concatenated. Likewise, the FIG. 4D shows the MPEG2 base frame, with extension frame as fractional payload inside the burst repetition time represented by the lower arrow, that in its turn needs a preamble and allows for trailed stuffing zeroes to the frame.

Now, by using units of 32 sample periods per subband filter, synchronization is maintained. In this respect, FIG. 5 shows a burst of data type 'PAUSE' inside its burst repetition time indicated by the bottom arrow. The length is 1024 bits=32 IEC frames, increased with the stuffing zeroes. As earlier, the four indications Pa, Pb, Pc, Pd are preappended. The user content is all zero. Another and preferred size of the burst allows for 3×32=96 frames. The burst frame has of course a dummy content; the longer version allows better synchronization to the LFE feature that occurs every 96 frames. Due to the relatively small size of pause bursts, the transition between pause and non-pause has a small granularity size.

2. Hardware Embodiments

Figure 6:
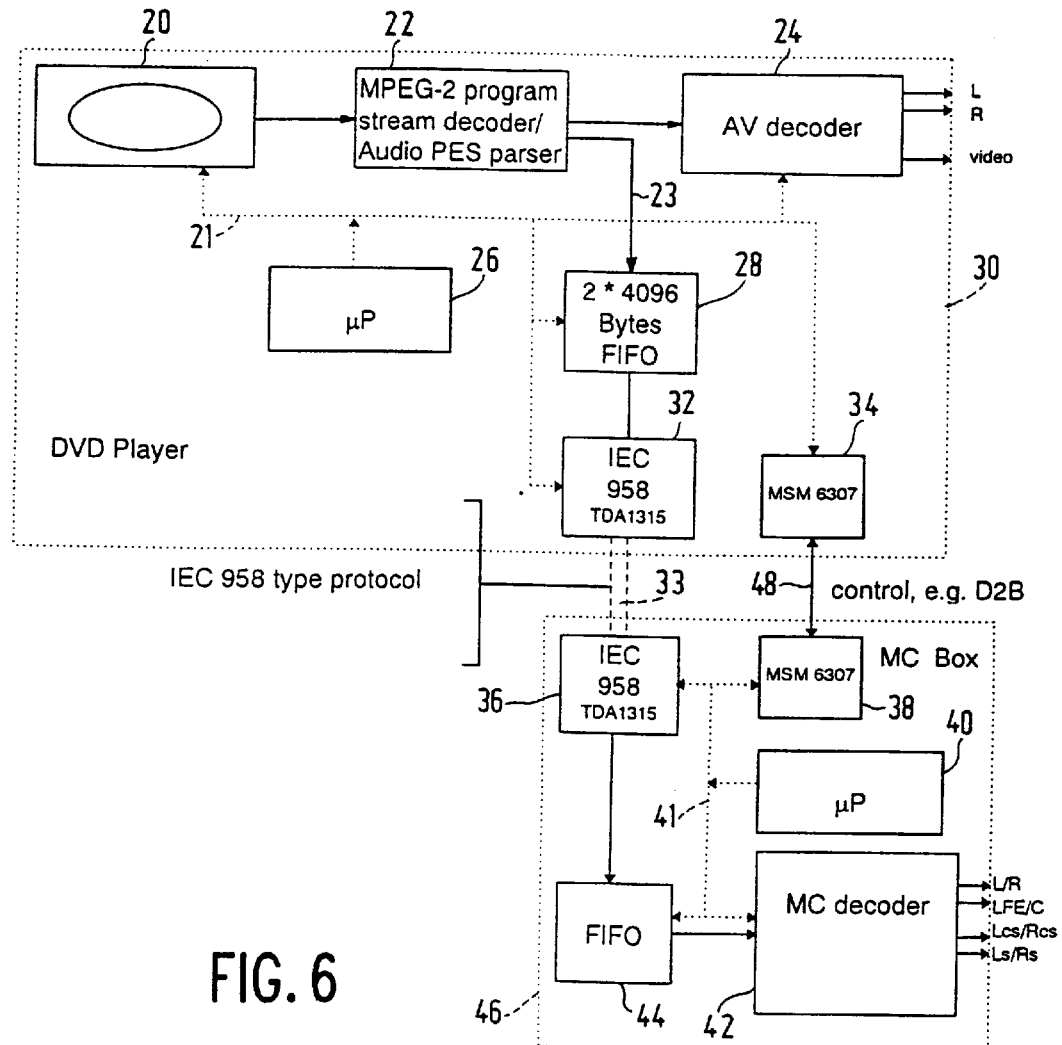
FIG. 6, a block diagram of connected DVD player and MC_Box.
Figure 9:
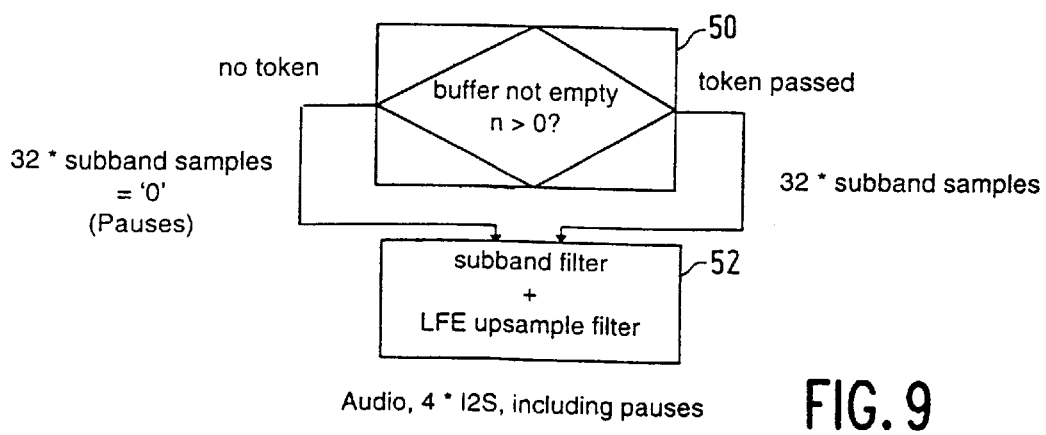
FIG. 9, a decoding flow chart of a subband filter DSP.

FIG. 6 is a block diagram of an interconnected DVD player 30 and an MCBox 46. In player 30, block 20 symbolizes a turn-table and associated read-out and feedback mechanisms, associated control signals being transferred by means of control path 21. Control processing is in microprocessor 26. Block 22 is an MPEG2 program stream decoder and audio parser that separates the massive bitstream received into standard stereo audio and video streams on the one hand to go to audio-video decoder 24, and furthermore, multi-channel bitrate reduced audio data on channel 23. Audio-Video decoder 24 operates in a standard manner for separating the bit stream into left and right audio channels and video as indicated. In fact, this type of reproduction is conform to the MPEG1 standardization. Relatively low-level consumer applications would do with the system as described thus far. DVD player 30 is implemented with a user control interface, such as hard buttons, soft keys, display.

For attaining full functionality of MPEG2, an external multichannel MC_box 46 has been provided. To this effect, first in player 30, the MPEG data is configured according to the burst format described with respect to the earlier Figures. Next, this requires an output channel 33 for data according to the standardized IEC 958 protocol, and which is used to convey a non-PCM bitstream inclusive of various commands for the MC_box. The channel may be based on galvanic interconnection or optical fibre. Optionally, interconnection is by a uni- or bidirectional channel 48, in particular for transmitting commands to the DVD player. The channel may be protocolled according to D2B described in U.S. Pat. No. 4,429,384 to the present assignee. Moreover as shown, a FIFO 28 is provided that by way of example accommodates 8 k Bytes as generally required for intermediate storage of MPEG data, a bus interface circuit 32 of commercially available type TDA1315, and a control interface circuit 34 of type MSM6307, organized according to the D2B protocol. Alternatively, block 32 receives commands from the microprocessor 26 on the data path, rather than on its control path.

Like the DVD player, MC_box 46 has an internal control path 41, interface circuit 38 of type MSM6307, and control processing in microprocessor 40. In correspondence to FIFO 28, the MC_box 46 has a relatively small FIFO 44. This stores the data of one bitstream while the previous one is decoded locally. The decoding pertains first to the burst level, and next to the sample level. The output from FIFO 44 feeds MC_decoder 42 that may output up to seven audio channels as indicated: Left, Right, LFE/C, Left center surround, Right center surround, Left surround and Right surround. As shown, these are grouped on four I2S interfaces, according to a protocol described in U.S. Pat. No. 4,755,817 to the present assignee. Alternatively FIFO 44 plus decoder 42 are combined into a single hardware block and controlled directly by the commands contained in the IEC 958 data. Moreover, the MC_Box attaches to the secondary control channel 48 by means of circuit 38.

Figure 7:
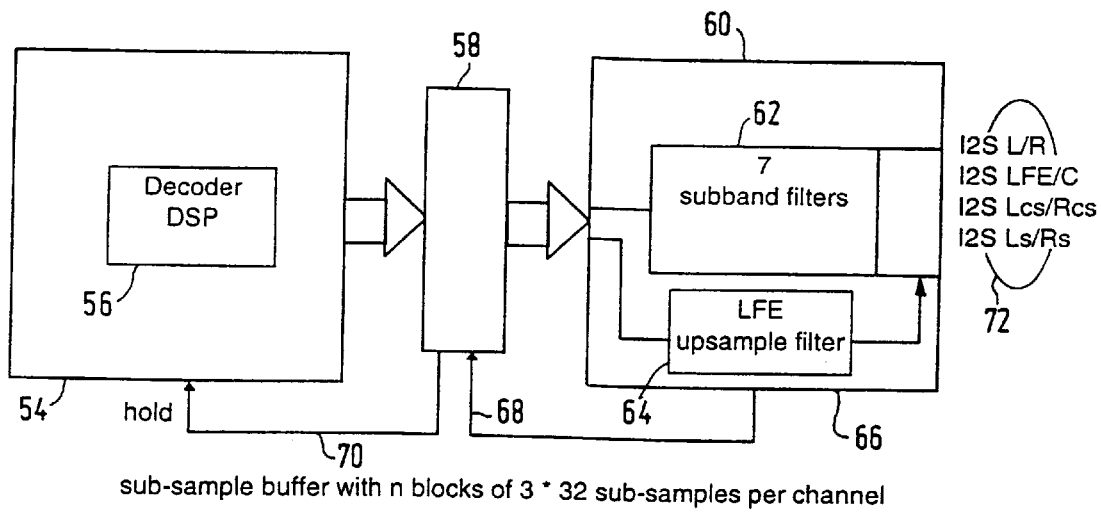
FIG. 7, a block diagram of a multi-channel audio decoder.
Figure 11:
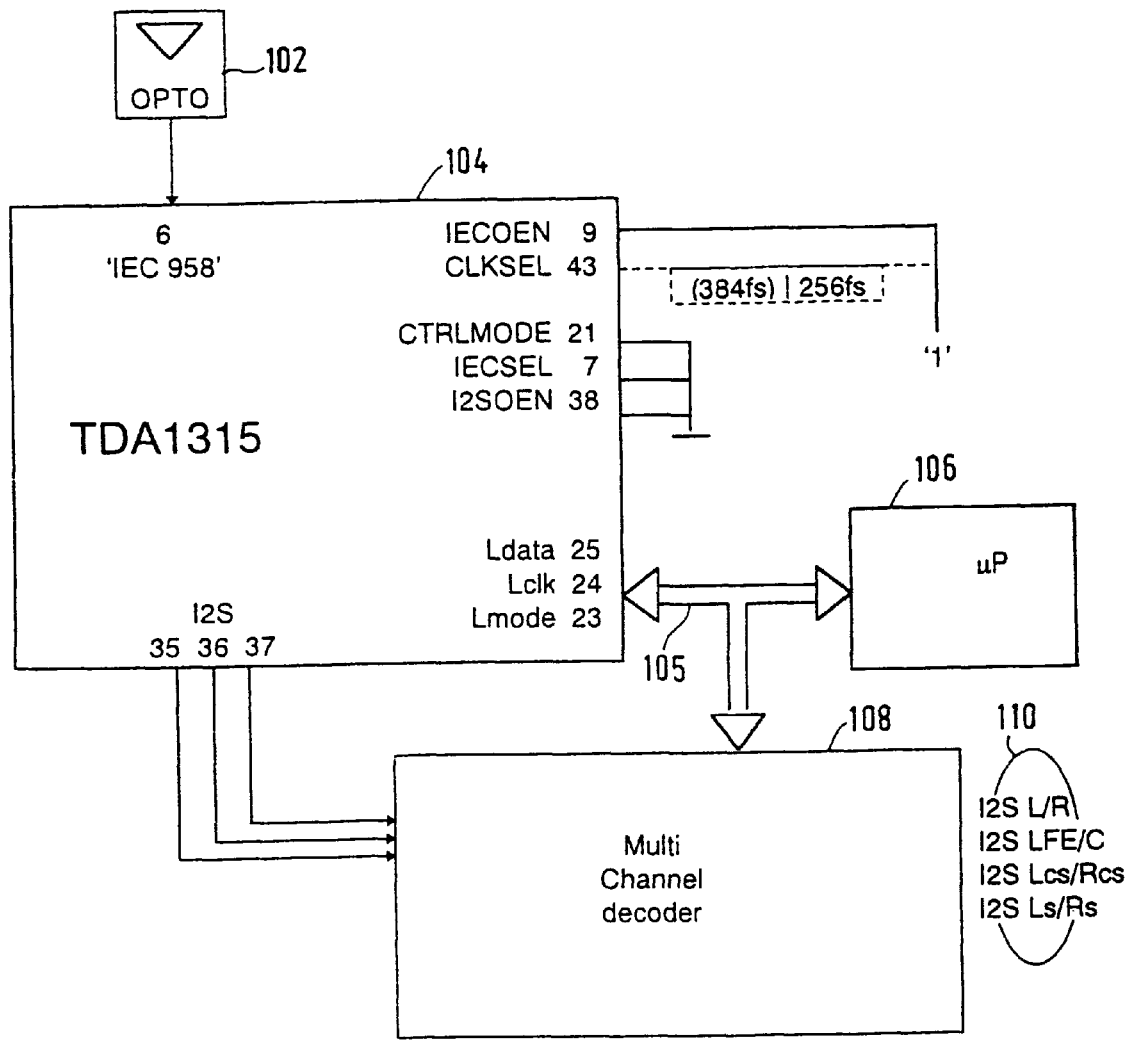
FIG. 11, a block diagram of an IEC 958 receiver station.

FIG. 7 is a block diagram of a multi-channel audio decoder, as contained in block 42 in FIG. 11. First, the decoding proper is executed in block 56 according to the process described with reference to FIG. 8, and implemented with a Motorola DSP processor of the 56000 series architecture. Also, the dematrixing is executed in this processor. Block 54 symbolizes a control shell to the processor in question. The output of the first DSP processor is organized in blocks that each contain for each appropriate channel 3*32=96 subsamples. For such channel at the highest applicable sample frequency of 44.1 kHz, the block length corresponds to an interval of 2 msec, which is considered a sufficiently fine granularity to be practically imperceptible.

Block 58 is an intermediate buffer that can hold n blocks as specified supra, optimized as regards to cost versus allowable occurrence of over/underflow; expected value of n is about four. Line 70 transmits a stop/go signal to DSP shell 54 that functions as source; line 68 transmits a request signal from the data destination block 60.

Block 60 executes the demultiplexing function with respect to the maximum of seven channels received; it is based on a similar Motorola 56000 DSP processor. In particular, block 62 symbolizes the subband filtering, whereas block 64 symbolizes an LFE upsample filter. Again, the processor shell has been indicated by block 66. During each execution cycle, 32 subchannels per channel are filtered, and unloaded by means of a dual port RAM: the length of a cycle is thus for a sample frequency of 44.1 kHz:32/44, lk=0.725 millisec. The delay length of the RAM for each channel is advantageously equal to 3*32 subsamples. Filtering takes place when 3*32 subsamples have been received, otherwise the subband filter will output all zeroes signalling an audio pause, which thus has a reduced granularity with respect to prior art. The processor will contain a 'free running' function, and will continually output audio samples at uniform intervals. The first DSP 56 will continually produce audio samples in bursts of 1152 samples per channel, 12 groups of 3*32 samples each for each and every channel. The real-time demand is on subband filter 62. If applicable, decoder 56/54 is put on "hold" to avoid an overflow of buffer 58.

The MC Box does not have a user control interface, but the data received on the IEC unidirectional interconnect 33 are used for effecting control, inclusive of the soft-mute and concealing feature according to the invention. If required, the D2B interconnect allows for sending control signals in the reverse direction. The multichannel decoder 60 can be controlled by decoder 54, such as by means of an I2C interface as disclosed in U.S. Pat. No. 4,689,740. This will be robust enough to recover from error conditions. However, no status output to a user is deemed necessary. If underflow occurs in buffer 58, the soft mute feature is controlled subsequently.

Figure 8:
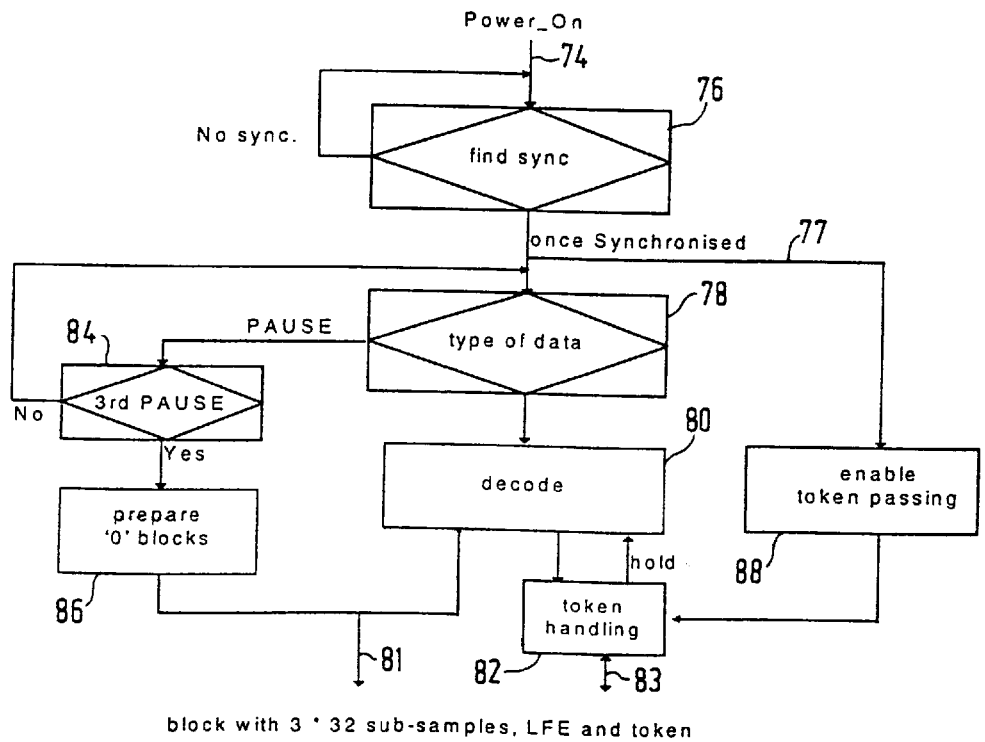
FIG. 8, a decoding flow chart of a digital signal processor.

FIG. 8 shows a decoding flow chart of a processor, in particular digital signal processor 54 in FIG. 7. The received input bitstream is symbolized by 74, on which the decoder continually undertakes a synchronizing operation 76. Actual decoding starts in block 78 as soon as DSP 54 synchronizes and a next concatenated frame through the synchronizing words Pa, Pb is received. Frame item Pd gives the length of the payload. When synchronized, decoder 54 for each frame produces twelve groups of 3*32 sub-samples for each channel. Decoder 56 is put on hold when the free area in the sub-sample buffer is not sufficient to store all sub-samples of that group (of 3*32) sub-samples for each channel to avoid buffer overflow.

The hand-shake between the sub-sample buffer and decoder DSP 56 is implemented by a token that indicates the current owner of the block in question; this token is transferred when synchronization has been effected (77, 88). In the flowchart, block 78 detects either audio data, or a pause. Unless third pause, data type detecting is continued (78). Upon meeting a non-pause, decoding is continued in block 80, and the decoding result is outputted on line 81, subject to the reception of a blocking token to put the processor on hold via block 82. The handshake is between blocks 80 and 82. Bidirectional connection 83 allows reacting to the filling degree of buffer 58. When the third pause is received (84), block 86 prepares zero output blocks for outputting on line 81 as an alternative to the decoding results from block 80, to function as 'soft mute' information.

FIG. 8 is a decoding flow chart of subband DSP filter 62 in FIG. 7. Each cycle, the subband DSP receives 32 subsamples per channel at its input; if no subsamples are available, the input will become all zeroes as a soft-mute. The subband filter DSP processes blocks of 32 sub-samples and produces 7 out of 8 signals for the four I2S interfaces shown in the Figure. The eighth signal LFE will be upsampled by block 64. The filter operates according to a continuous process, producing audio at equidistant time intervals. After power-on, all outputs are muted by default; the output registers will contain zeroes until the subband filter is initialised after 512 sample periods.

In the implementation, block 50 detects whether the buffer 58 is not empty. If empty, zeroes are output in such a way as to maintain synchronization. If not empty and a token has been passed, the block output is at right, and 32 samples are outputted for each actual channel, plus a single LFE sample. If not empty and no token has been passed, the block output is at left, and 32 zero subband samples are outputted to emulate a pause. Both outputs from block 50 lead to the input of subband filter 62 and LFE upsample filter 64 in FIG. 7.

The token indicates which processor is currently the owner of the block. An owner has read/write access to a block, non-owners can only read, such as read the token. Block ownership is only passed along by the owner of the block, render the actual owner to non-owner. After power-on, all tokens will be handed to the decoder DSP. Absent a token, the subband filter will clear all registers and will filter exclusively zeroes. When synchronizing on the Burst__Preamble, the first token shall be passed to the subband filter DSP after an expected 'worst case' decoding time.

Figure 10:
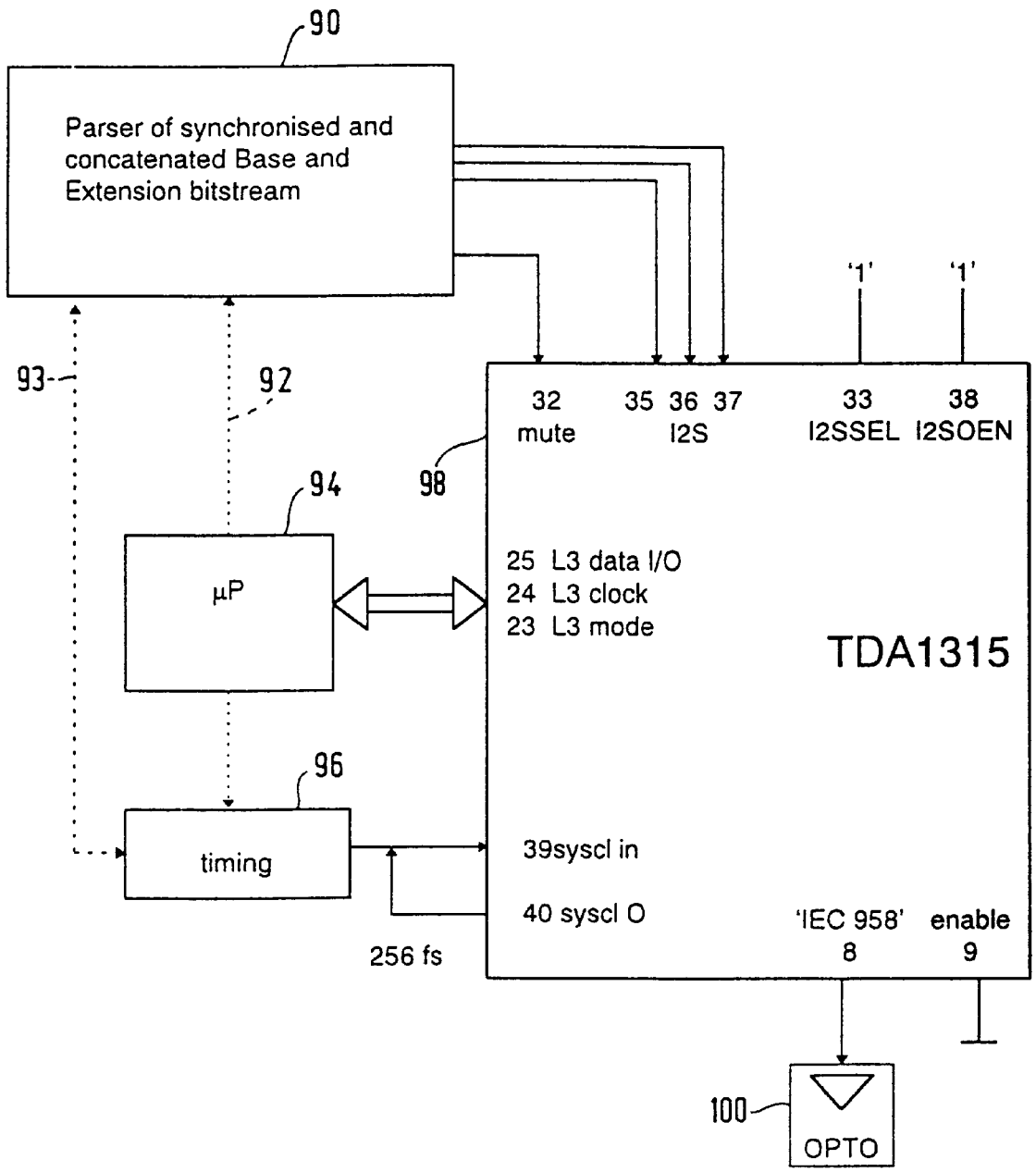
FIG. 10, a block diagram of an IEC 958 transmitter station.

FIG. 10 is a block diagram of an IEC 958 transmitter station, of which a central part is the commercially available TDA 1315 circuit 98 interconnected as shown. Block 90 symbolizes the parser of synchronized and concatenated Base and Extension bitstreams (block 22 in FIG. 11). Microprocessor 92 corresponds to microprocessor 26 in FIG. 11. Microprocessor 92 interacts with interface circuit 98 along a three-wire L3 control bus protocolled according to U.S. Pat. No. 5,434,862 assigned to the present assignee, and connected to pins 23, 24, 25 as shown. The data output from block 90 is protocolled according to the I2S format and connected on pins 35, 36, 37 as shown. Input 32 receives a mute control signal from parser 90, pin 33 an I2S selection signal and pin 38 an I2S output enable signal, these two continuously at logic 1. Timing control block 96 is controlled by microprocessor 92, and handshakes along interconnection 93 with parser block 90. Also, it handshakes on a sync cycle basis with TDA 1315 on pins 39, 40. Finally, the circuit outputs serial data according to IEC 958 on pin 8, and receives an enable signal on pin 9 at a continuously low value. Block 100 is an electric to optical converter, allowing a remote position of the MC__Box.

FIG. 11 is a block diagram of an IEC 958 receiver station. Data is received as 16 bit words over optical-to-electric converter 102 and transferred to IEC 958 input pin 6. Standard control pins are ConTRLMODE at pin 21, IEC-SELection pin 7, and I2SOoutputENable pin 38, all three held at logic ground. Furthermore, there are IECOEoutputenable pin 9 and CLIocK SELection pin 43, both held at logic high (1). The clock selection allows to select between 384 kHz and 256 kHz. The data output from TDA 1315 is by means of an I2S protocol on pins 35, 36, 37 to multi-channel decoder 108. This produces the four output bit streams as deemed in FIG. 11. Control interconnection between TDA 1315, the microprocessor (item 40 in FIG. 11) and multi-channel decoder 108 is protocolled according to the I2S protocol referred supra.

Figure 12:
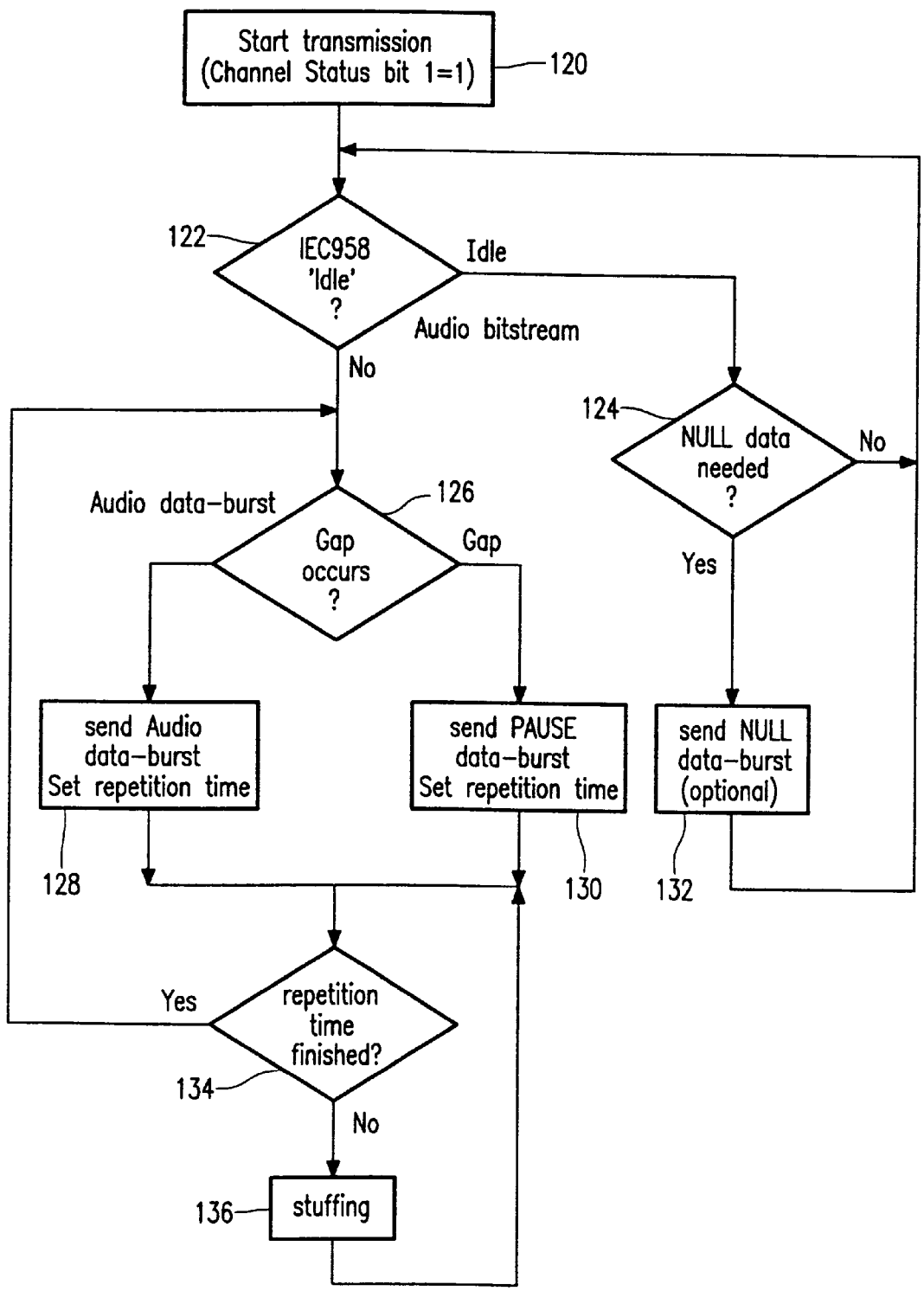
FIG. 12, a flow chart of bit stream transmission.

FIG. 12 is a flow chart of bitstream transmission. In block 120, transmission is started. Channel status bit 1 becomes "1" In block 122 IEC 958 "Idle" is detected. If "Idle", in block 124 it is detected whether NULL data is needed. If "No", the system reverts to block 122. If "Yes", in block 132 a NULL data burst is sent; the latter feature is optional. If in block 122 an Audio bitstream is detected, in block 126 it is detected whether a Gap occurs. If "Gap", in block 120 a PAUSE data burst is sent. Also, the repetition time is set. If in block 126, an Audio data-burst is detected, an audio data burst is sent. Also, the repetition time is set. Both after block 128 and after block 130, in block 134 it is detected whether the repetition time has finished. If No, in block 136 "stuffing" is executed, and the system reverts to block 134. If in block 134, the repetition time has finished, the system reverts to block 126.

PAUSE data-bursts are intended to fill small discontinuities in the bitstream, the gaps which may occur between two data-bursts of a non-PCM encoded audio data type. PAUSE data-bursts convey information of the audio decoder that a gap exists. The PAUSE data-bursts may also indicate the actual length of the audio gap, or that the non-PCM audio data stream has stopped. This information may be used by the audio decoder to minimise (or conceal) the existence of the audio gap, or in the case that the bitstream stops, to trigger a fade-out of the audio. A sequence of PAUSE data-bursts can also assist decoder synchronization prior to the beginning of a non-PCM audio bitstream. It is recommended to send a short sequence of PAUSE data-bursts immediately preceding the transmission of the first audio data-burst.

| Data burst | stuff- ing | P | stuff- ing | P | Stuff- ing | P | stuff- ing | Data burst | stuff- ing | Data burst |
|---|---|---|---|---|---|---|---|---|---|---|
| R | | R | | R | | R | | R | | R |

In this example, P indicates a PAUSE burst, P+subsequent stuffing represents the repetition time of PAUSE, and the total gap in between the data bursts is three times as long. The length of Data burst+stuffing is the repetition time of the burst. The PAUSE burst is transferred with the same bit stream number as the bit stream number of the audio data stream which contains the gap that the PAUSE data-bursts are filling, or for which synchronization is being assisted.

The PAUSE data-burst contains the burst__preamble and a 32-bit payload. The first 16 bits of the payload contain the audio gap__length parameter. The remaining bis are reserved, and should all be set to '0'. The audio gap__length parameter is an optional indication of the actual audio gap length. This is the length, measured in IEC958 frames, between the first bit of Pa of the first PAUSE data-burst and the first bit of Pa of the next Audio data-burst. The detailed use of the PAUSE data-burst depends on the data-type of the Audio data-burst. For example, gaps between AC-3 data bursts are filled with a sequence of very short PAUSE bursts, and the repetition time of PAUSE data-bursts between data-bursts of an MPEG type is related to the algorithm. The gap__length parameter of the first PAUSE data-burst of the sequence may be used to indicate the length of the audio gap which is being bridged by the sequence of PAUSE data-bursts. The PAUSE data-bursts in the sequence which follows the initial PAUSE data-burst do not have a gap__length specified (gap__length=0). A gap may be filled with one single sequence of PAUSE data-bursts with a single indication of audio gap_length. For example, a gap corresponding to an audio gap of 768 samples may be filled with one sequence of PAUSE data-bursts with an indication of gap-length=768 in the initial PAUSE data-burst. Or this gap could be filled with a number of smaller sequences of PAUSE data-bursts, with the initial PAUSE data-burst in each sequence indicating the gap_length bridged by that sequence (E.g. one sequence with a gap-length of 200 samples, followed by a sequence with gap-length of 568, together bridging a gap of 768 sample periods).

The information about the full length of the audio gap in the first PAUSE data-burst will allow the decoder to perform the best concealment. However, if the data source does not have the information about the full audio gap length at the time the gap begins, then it may signal an initial value for gap_length. If the data source then determines that the audio gap will be longer than the initial indication, then another sequence of PAUSE data-bursts may be initiated (following the first sequence by the repetition time) with another gap_length value to signal the decoder that the audio gap is being extended. If the gap is further extended, additional sequences may be initiated.

Audio decoders may use the gap_length information to optimise their concealment of the audio gap. The inclusion of non-zero values of gap_length is optional, data sources are not required to indicate the length of the audio gap.

The data type PAUSE has a sequence of four control words Pa, Pb, Pc, Pd followed by the Payload and the Stuffing.

"Gaps" are discontinuities in a bitstreams, and may be due to switching between bitstreams. The length of the gaps depend on the timing of switching from one to the other bitstream, and may have any value. The length of a gap however, depends on the decoder which must be able to conceal the gaps. Therefore the transmitter shall adjust the length of the gap to a multiple of the repetition time of PAUSE data-bursts. The PAUSE data-burst has its repetition time, which gives the time of transmission of Pa of the next data-burst.

Some AC-3 decoders may be capable of "concealing" audio gaps. The indication of the audio gap length (gap_length) which may be included in the payload of the PAUSE data-burst allows the decoder to know how long an audio gap will need to be concealed, and thus allow the decoder to optimise the concealment process for the actual audio gap length. AC-3 decoders will most easily conceal audio gaps which have a length equal to an integral multiple of 256 samples. Thus audio gaps of length 256, ?68, etc. IC958 frames are preferred, as follows:

| data-type of Audio data-burst | repetition time of PAUSE data-burst | |
|---|---|---|
| | mandatoty | recommended |
| AC-3 data | | 3 IEC958 frames |
| MPEG-1 Layer 1 data | 32 IEC958 frames | |
| MPEG-1 Layer 2 or 3 data or MPEG-2 without extension | 32 IEC958 frames | |
| MPEG-2 data with extension | 32 IEC958 frames | |
| MPEG-2, layer-1 Low sample rate | 64 IEC958 frames | |
| MPEG-2, layer-2 or 3 Low sample rate | 64 IEC958 frames | |

The AC-3 bitstream consists of a sequence of AC-3-frames. The data-type of a AC 3 data-burst is 01 h. An AC-3 frame contains 1536 samples for each encoded channel. The data-burst is headed with a burst_preamble, followed by the burst_payload. The burst-payload of each data-burst of AC-3 data shall contain one complete AC-3-frame. The length of the AC-3-data-burst will depend on the encoded bit rate (which determines the AC-3-frame length). An AC-3 data burst with reference instant R comprises again four control words Pa, Pb, Pc, Pd an AC-3 burst_payload, and stuffing.

I claim:

1. A method of transferring a non-PCM encoded multichannel bitstream to digital audio reproduction apparatus via an interface which is adapted for transfer of PCM encoded bitstreams, the non-PCM encoded multichannel bitstream resulting from parsing a multichannel bitstream received from a digital video disc (DVD), comprising the steps of:

(i) recurrently packaging audio samples of the non-PCM encoded multichannel bitstream in data burst payloads;

(ii) packing the data burst payloads as user data in successive frames having a predetermined format including pause bursts signifying the absence of audio in all channels, each pause burst having a duration in the range below 10 milliseconds; and (iii) decoding and supplying the packaged data burst payloads of the respective channels to respective channel inputs of said audio reproduction apparatus.

2. A method as claimed in claim 1, wherein each pause burst has a repetition interval of 32 or a multiple of 32 of the periods of said audio samples.

3. A method as claimed in claim 1, wherein the presence of a pause burst is indicated by a burst header in the non-PCM encoded multichannel bitstream.

4. A method as claimed in claim 1, wherein each pause burst has a repetition period not over one-fifth that of any non-pause burst in the non-PCM encoded multichannel bitstream.

5. A method as claimed in claim 1, wherein the data bursts have a repetition period of 384 periods of the audio samples.

6. A method as claimed in claim 1, further comprising adding stuffing zeros to the data burst payloads in order to maintain a uniform size burst format, the bursts being multiplexed among the multiple channels in a recurrent manner, relevant data from other channels being superposed on stuffing zero positions in channels having stuffing zeros.

7. A coupling device for transferring a non-PCM encoded multichannel bitstream to digital audio reproduction apparatus via an interface which is adapted for transfer of PCM encoded bitstreams, the non-PCM encoded multichannel bitstream resulting from parsing a multichannel bitstream read from a digital video disc (DVD); comprising:

means for recurrently packaging audio samples of the non-PCM encoded multichannel bitstream in data burst payloads;

means for packing the data burst payloads as user data in successive frames having a predetermined format including pause bursts signifying the absence of audio in all channels, each pause burst having a duration in the millisecond range below 10 milliseconds; and means for decoding and supplying the packaged data burst payloads of the respective channels to respective channel inputs of said audio reproduction apparatus.

8. A method of transferring a non-PCM encoded multichannel bitstream to digital audio reproduction apparatus via an interface which is adapted for transfer of PCM encoded bitstreams, the non-PCM encoded multichannel bitstream resulting from parsing a multichannel bitstream read from a digital video disc (DVD), the parsed bitstream being received as a sequence of frames which accumulates, for each channel, a uniform number of data bits, comprising the steps of:

storing each frame in an intermediate frame buffer;

detecting the presence of data pertaining to a particular output channel or the absence of such data as represented by one or more sequential pause bursts;

upon detecting the presence of said data in said detecting step, decoding and outputting decoded information for the particular channel; and upon detecting one or more sequential pause bursts in the detecting step, controlling a soft mute block to conceal the absence of said data.

9. A coupling device for transferring a non-PCM encoded multichannel bitstream to digital audio reproduction apparatus via an interface which is adapted for transfer of PCM encoded bitstreams, the non-PCM encoded multichannel bitstream resulting from parsing a multichannel bitstream read from a digital video disc (DVD), comprising:

means for receiving said parsed bitstream as a sequence of frames which each accommodate, for each channel, a uniform number of data bits;

an intermediate frame buffer for storing each frame;

detection means for detecting the presence of data pertaining to a particular output channel or the absence of such data as represented by one or more sequential pause bursts;

decoding means controlled by said detection means for decoding and outputting from a stored frame decoded information for said particular channel; and means responsive to detection by said detection means of said one or more sequential pause bursts to control an audio soft mute block of said one or more sequential pause bursts to conceal the absence of data in said mute block.

* * * * *